United States Patent [19]

Braun

[11] 4,360,827

[45] Nov. 23, 1982

[54] METHOD AND MEANS FOR INTERACTIVE AUDIO AND VIDEO CONFERENCING

[75] Inventor: Daryl Braun, Harvard, Ill.

[73] Assignee: Darome, Inc., Harvard, Ill.

[21] Appl. No.: 269,461

[22] Filed: Jun. 2, 1981

[51] Int. Cl.³ .............................................. H04N 5/04
[52] U.S. Cl. ................................. 358/85; 179/1 CN; 179/2 TV; 358/149; 455/12; 455/13
[58] Field of Search ................... 358/85, 149, 143, 185; 179/1 CN, 18 BC, 2 TV; 455/12, 13

[56] References Cited

U.S. PATENT DOCUMENTS

| | | | |
|---|---|---|---|
| 3,939,306 | 2/1976 | Mosca | 358/149 |
| 3,962,634 | 6/1976 | Russo | 358/149 |
| 4,220,821 | 9/1980 | Lucas | 179/18 BC |
| 4,289,932 | 9/1981 | Reed | 179/1 CN |
| 4,313,135 | 1/1982 | Cooper | 358/149 |

OTHER PUBLICATIONS

Braun, Daryl P., "Implementing, 'Meet-Me'Bridging in MTS," May 7, 8, 1979, Technical Design for Teleconferencing, Madison, Wis.

*Primary Examiner*—Howard Britton
*Attorney, Agent, or Firm*—Leydig, Voit, Osann, Mayer & Holt, Ltd.

[57] ABSTRACT

A method and system for establishing an interactive audio and video conference. A plurality of geographically dispersed interactive sites are connected via the ordinary message telephone system to a central conferencing bridge. The bridge mixes the audio signals received from any of the interactive sites and distributes it to all such sites. The video signal is created in a television studio and transmitted as a conventional television signal via satellite. Steps are taken to bring the moderator at the studio site into the interactive conference while avoiding the echo problems which would normally be created. Moderator audio is conveyed to the bridge site via ordinary telephone lines where it is delayed by a period sufficient to compensate for the difference between satellite and telephone transmission times. The so-delayed signal is added to the mix such that moderator audio is received at each interactive site in synchronism with the satellite received video. A mix minus moderator signal is created at the bridge site and transmitted via ordinary telephone lines to the studio for reception by the moderator and for transmission in the TV signal to non-interactive sites.

10 Claims, 4 Drawing Figures

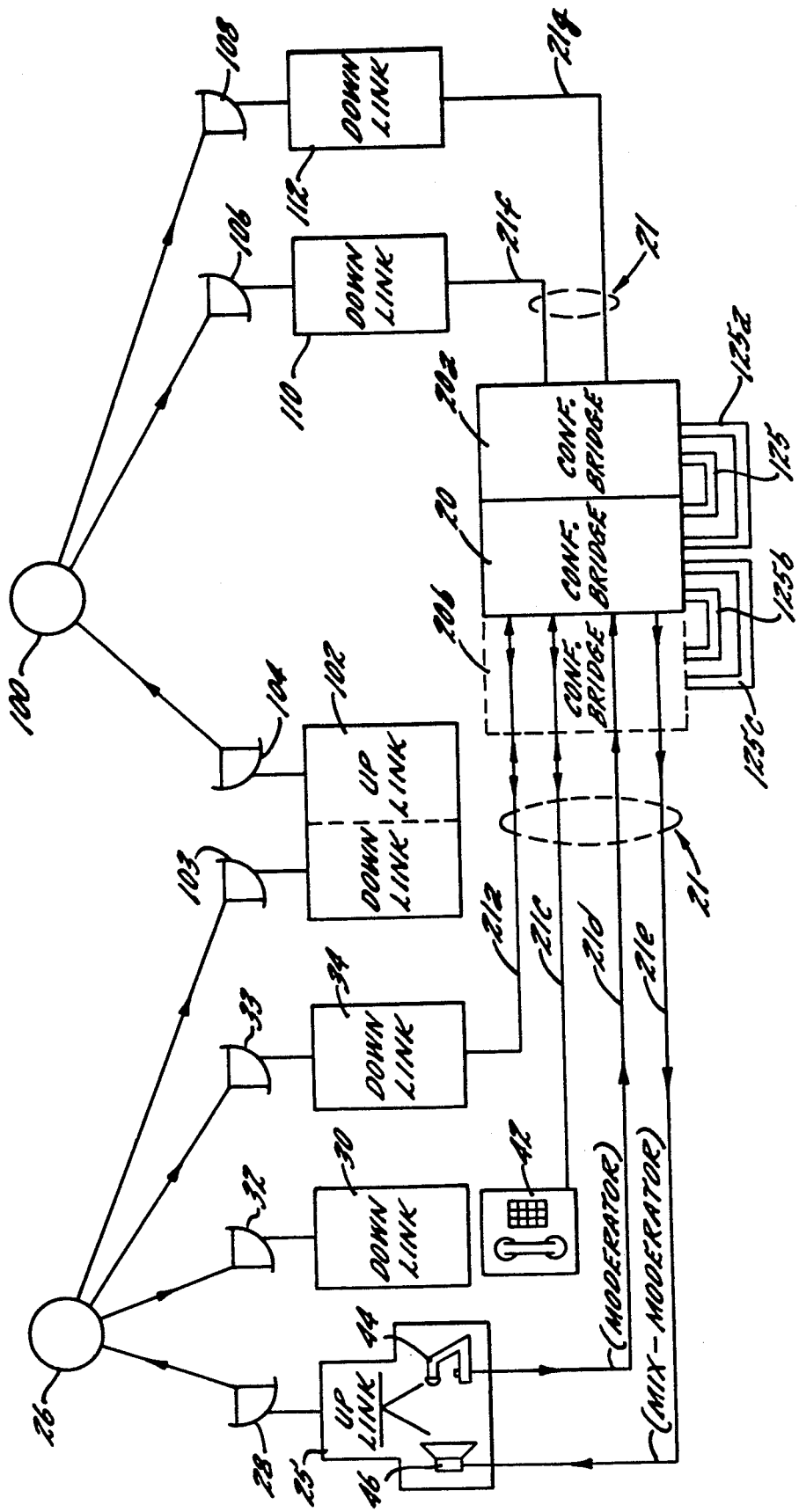

METHOD AND MEANS FOR INTERACTIVE AUDIO AND VIDEO CONFERENCING

This invention relates to teleconferencing and more particularly to a method and system for establishing an interactive audio and video conference.

Interactive telephone conferences are becoming increasingly popular as means for efficiently exchanging ideas between people at a plurality of distantly-located stations. For example, representatives of a corporation spread at 20 or more locations across the country (or the world for that matter) might desire to "meet" periodically to discuss common problems or goals. Using modern sophisticated bridging equipment such as the Darome 2020 Conferencing Bridge, each of the parties desiring to meet, telephones a predetermined number at the meeting time, whereupon they are connected to the bridge and converse among themselves almost as if they were in the same room. The obvious savings in travel time and expense allows such meetings to be scheduled when needed rather than deferred because of cost.

There are times, however, when it is desirable to enhance the interactive conference by means of a live video presentation. For example, for a sales presentation, a corporation might rent a television studio having access to satellite transmission facilities, and establish meeting locations across the country in rooms having satellite reception facilities or cable hookups to such facilities. To make the conference interactive, teleconferencing equipment can be used to create a meeting as described above. However, because of the substantial satellite transmission delay of about 250 milliseconds (which makes ordinary telephone transmission delays negligible by comparison) it has not previously been possible to effectively coordinate all of the audio and video signals in the system. If the audio portion of the television signal is relied on to convey audio from the studio site to the interactive sites, difficulties arise when an interactive site attempts to talk to the moderator at the studio site. More particularly, an audio signal originating at an interactive site and rebroadcast at the studio will return to the originating site, but delayed by approximately a quarter second due to the satellite transmission delays. The speaker will hear his own echo delayed by an interval sufficient to create confusion in the speaker and perhaps prevent him from continuing. To overcome that problem, it would appear to be necessary to modify each television receiver by bringing the electrical signal carrying the audio information outside of the television, passing it through an echo suppressor type of device which would, in effect, turn off the TV audio whenever a participant at the conference site in question were transmitting to the studio. That solution is not particularly desirable because it requires the use of specialized television receivers for conferencing.

If one were to attempt to convey the moderator audio signal to the conferees, not as part of the television signal, but on telephone lines, then one would be faced with the problem of the TV signal arriving at the conference site approximately one-quarter second behind the associated audio signal, giving the unnatural appearance of an out of sync movie.

In view of the foregoing, it is an aim of the present invention to provide a truly interactive audio and video conferencing arrangement which appears natural to all conferees and which does not require specialized TV reception equipment at the conference sites.

More particularly, it is an object of the invention to incorporate the audio portion of the video transmission directly into the conference mix signal, but in a manner which does not detract from the combined audio/video presentation at each conference site.

Further in that regard, an object is to return an audio signal to the broadcast site which conveys conference audio information to the moderator without confusing him with his own echo.

According to one feature of the invention, it is an object to territorially expand such a conference system by using more than a single satellite, and properly accounting for single or multiple satellite delay intervals.

Other objects and advantages will become apparent from the following detailed description when taken in conjunction with the drawings in which:

FIG. 4 is a schematic illustration of an expanded conferencing system utilizing more than a single satellite.

While the invention will be described in connection with currently preferred embodiments, there is no intent to limit it to those embodiments. On the contrary, the intent is to cover all alternatives, modifications and equivalents included within the spirit and scope of the invention as defined by the appended claims.

Figure 1:
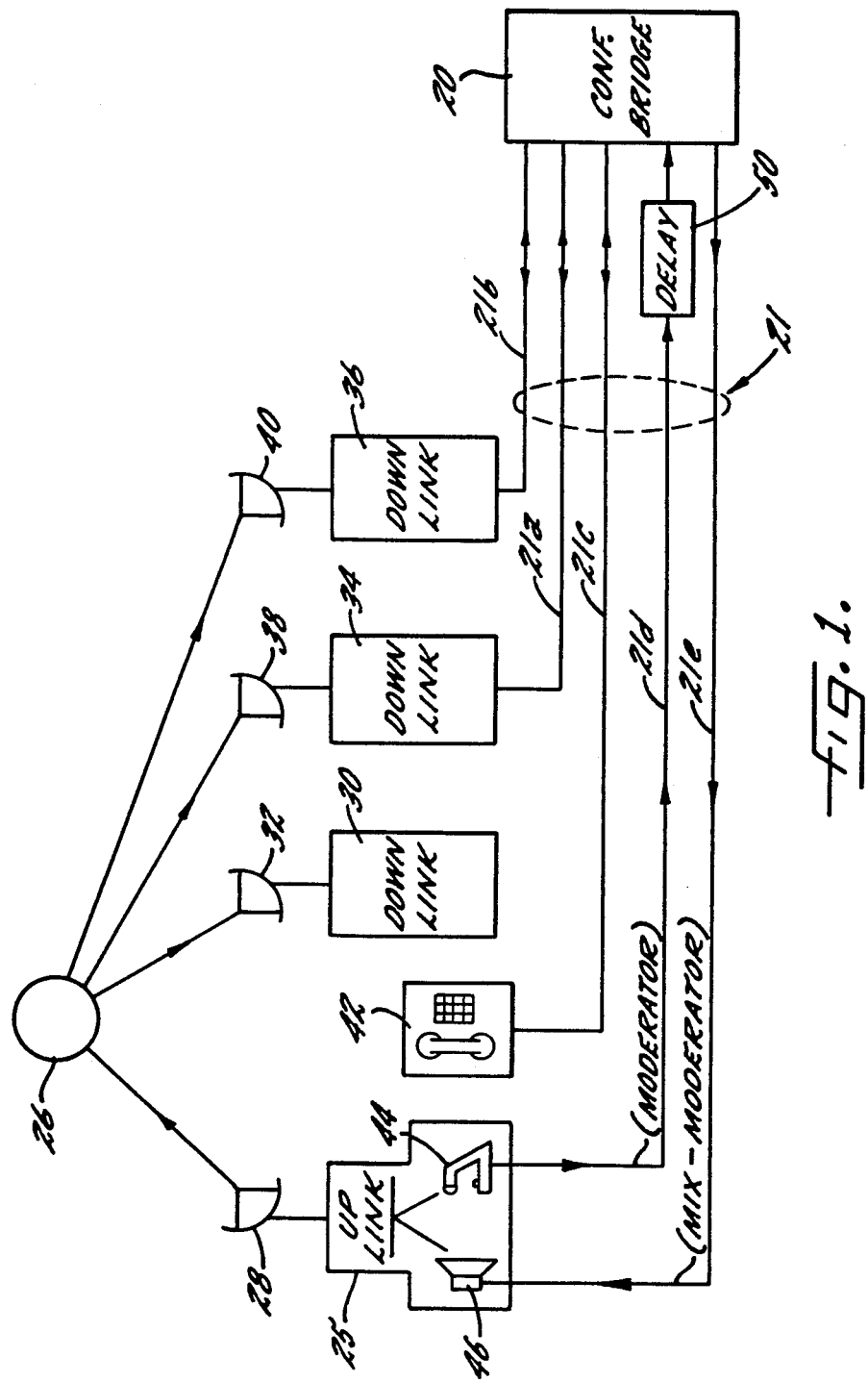
FIG. 1 is a diagram schematically illustrating an audio and video interactive conferencing arrangement exemplifying the present invention.

Turning now to the drawings, FIG. 1 shows in simplified schematic form the elements of an audio and video interactive conferencing system embodying the present invention. Central to the interactive audio aspect of the conference is a bridge circuit 20 having the capability of linking a plurality of telephone lines generally indicated at 21. Although various bridging arrangements can be used to create the audio portion of the conference, the bridge is preferably of the type commercially available from Darome, Inc., of Harvard, Illinois, and designated the Model 2020. Such a bridge can be characterized as a 4 wire voice switched simplex bridge. Structural modifications to be described in detail below allow such a bridge to be incorporated in the system of this invention.

The video signal in the system typically originates at a conventional television studio 25 which creates a television signal for relay to a plurality of conventional television receivers via a satellite 26. For purposes of picking a name, the audio signal originating at the studio site will be called a moderator signal, with the understanding that no particular function is being imputed to the person speaking at the studio. In order to transmit the signal to the satellite 26, the studio site has associated therewith a directional antenna system 28, conventionally termed an uplink, aimed at the satellite 26 for sending the TV signal to the satellite for retransmission. The up-link can be at the studio site or remote, with the association being made by cable, microwave, or other available means.

By way of background, those familiar with this art are well aware that there are a number of communication satellites located in space in geostationary orbits, capable of receiving transmitted signals from an up-link and rebroadcasting them to earth. The satellites are at elevations of about 22,300 miles, and positioned over the equator such that their location with respect to any point on the ground remains stationary. In effect, the satellite acts like a 22,000 mile-tall transmitting tower. These communication satellites are used for many purposes including relaying telephone messages, encoded data, and TV signals, both on generally available channels and also on private channels. The main function of interest for the instant conferencing system is the ability to relay TV signals.

Receiving antennas, commonly known as down-links, can be dispersed over a fairly large geographic area and aimed at the satellite 26 to receive a signal containing the information transmitted on the up-link. FIG. 1 illustrates a plurality of sites associated with down-links. Such association can be by equipping the site itself with a receiving antenna and associated electronics, or alternatively by supplying a signal received elsewhere to the site via cable, microwave, or other available means.

Referring more particularly to FIG. 1, a first site 30 is associated with a down-link 32 aimed at the satellite 26 to receive the information originally transmitted via the up-link 28. Site 30 is referred to as a non-interactive site since no telephone line 21 connects such site with the conferencing bridge 20. However, due to the fact that the television signal includes both video and audio information, persons situated at the site 30 can receive all of the information transmitted in the conference.

FIG. 1 also shows a pair of interactive sites 34, 36 each associated with a down link 38, 40 aimed at the satellite 26 for receiving the television signal originating at the studio 25. In addition, the interactive sites 34, 36 are connected by means of telephone lines 21a, 21b to the conference bridge 20. While the telephone lines 21 are illustrated as direct connections for simplicity, it will be apparent that they are intended to represent any type of connection which can be made in the conventional message telephone system, as well as private lines, leased lines, satellite links and the like. In most cases, the lines 21 can be expected to be routed through a number of switching offices of various classes, with the user having no real control over the route he is allocated. The bridging equipment preferably includes adjustable amplification for each channel such that appropriate adjustments can be made for losses encountered in sending the signal from the remote site to the central bridge A further site 42 having a telephone connection 21c to the central bridge 20 but no down link for receiving a video signal from the satellite is intended to illustrate the flexibility of the system. More particularly, the conferees located at site 42 can fully participate in the interactive conference even though they do not have provision for receiving the video presentation.

In the typical practice of the invention, a pair of telephone lines 21d, 21e couple the studio 25 to the bridge 20. A first line 21d carries audio signals only from the studio 25 to the bridge 20, receiving such audio signals from a microphone 44 into which the moderator speaks. A second telephone line 21e carries signals from the bridge to the studio for driving a speaker 46. The audio signal conveyed to the speaker by the bridge allows the moderator to hear the interactive portion of the conference, and is also transmitted in the TV signal, so that non-interactive sites, such as site 30, have access to the interactive audio. Use of separate lines 21d, 21e for conveying audio to and from the studio precludes the possibility of echo produced at discontinuities in the telephone switching system from being returned to the studio for rebroadcast.

It is noted that it is possible to locate the bridge site and the studio on the same premises. In that case, the lines 21d and 21e can be implemented as two sets of audio conductors, rather than telephone lines as in the more conventional implementation. It is intended to encompass the minor variation within the scope of this invention.

In accordance with the invention, the interactive sites 34, 36 do not rely on the received television signal for carrying any audio information, but instead get all of the audio information on their telephone links to the bridge 20. More particularly, each of the interactive sites 34, 36 turns the volume on its TV set down so that the audio portion is inaudible. Teleconferencing equipment, such as Darome's commercially available Convenors can be connected to the telephone line 21 at any interactive sites populated by more than one person. That equipment has multiple microphones and a speaker to provide all participants at a site full availability to the associated telephone line. By virtue of the telephone connections 21 between each interactive site and the bridge, audio from any conferee connected in the bridge is conveyed to all others. However, because the moderator audio signal is carried by telephone line 21d, it reaches the interactive sites 34, 36 relatively instantaneously as compared to the video signal transmitted via the satellite 26.

In accordance with the invention, delay means 50 are provided for creating a delayed moderator signal and mixing such delayed signal into the mix at the bridge 20, with the delay being adjusted to assure that the telephone audio and television video signals arrive at each interactive site in synchronism. Synchronism is used herein to mean that the audio and video information arrive at a site sufficiently coordinated to make the combined presentation seem natural.

The length of the delay introduced by element 50 is dependent upon the difference in transmission times for the television signal via satellite and the telephone signal via the ordinary message telephone system. Since the satellite 26 is located approximately 22,300 miles above the earth, and since the transmitted signal travels at the speed of light or about 186,000 miles per second, a complete journey from the transmitting antenna 28 to the satellite 26 and back to a receiving antenna such as 32 takes about 240 milliseconds. Transmission time through the message telephone system is generally measured in tens of milliseconds, and is thus negligible by comparison, or can be compensated for by slightly altering the delay introduced by the delay means. Accordingly, the delay means 50 is set to introduce approximately a 230 or 240 millisecond delay in the moderator signal before adding it to the mix, so that the delayed audio signal sent through the telephone system arrives at each interactive site 34, 36 in synchronism with the television signal transmitted via satellite.

Because the moderator signal in the mix is delayed by about 240 milliseconds, it is important that the delayed moderator signal not be returned to the studio, where it would appear to the moderator as an echo. Accordingly, the bridge is configured to create a mix minus moderator signal and transmit that signal on telephone line 21e for driving the speaker 46. As a result, the moderator is provided access to all of the audio in the interactive mix, while being protected from his own echo.

As will become more apparent, the four wire simplex nature of the preferred bridge is the means for generating the mix minus moderator signal in the present embodiment. More particularly, since the bridge is a four-wire device with substantial loss from receive to transmit path in any given port, simply utilizing the transmit path associated with the port which receives the delayed moderator signal assures that the transmit path will carry the full mix minus the delayed moderator.

Those skilled in this art will appreciate that the invention described herein is sufficiently comprehensive to be used with a large number of bridging schemes. However, because it is presently preferred to use the Darome 2020 bridge, that bridge will be described in a general fashion to allow one to a better understand the usefulness of the invention with such a commercially available device. It is also noted that the bridge is described in a paper by Daryl P. Braun entitled "Implementing 'Meet-Me' Bridging in MTS" presented at the University of Wisconsin, Madison on May 7, 8, 1979-Technical Design for Teleconferencing.

Figure 2:
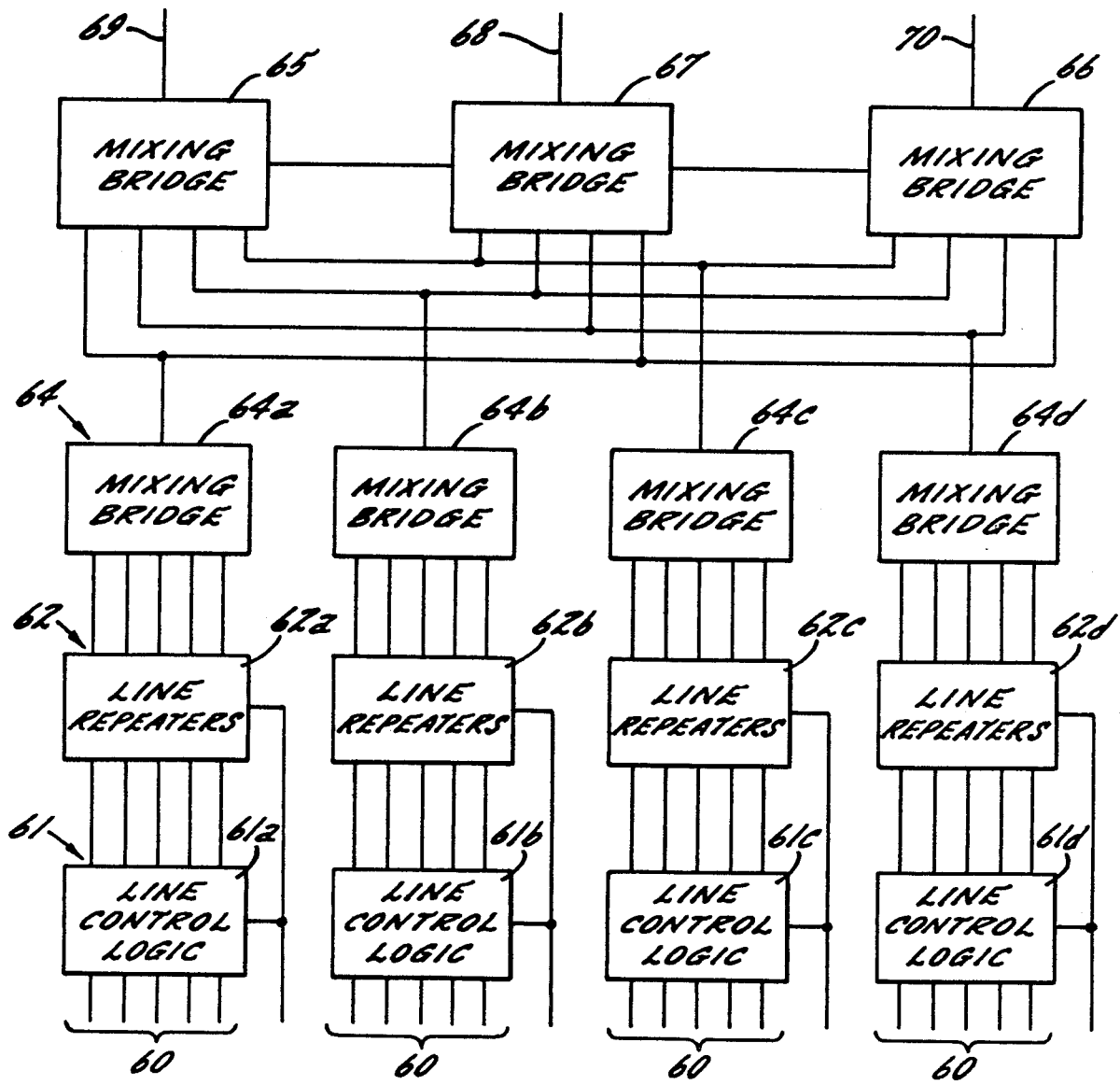
FIG. 2 is a block diagram illustrating a preferred conferencing bridge for use with the present invention.

Referring to FIG. 2, there is shown a simplified block diagram of the Darome 2020 four wire voice switched simplex bridge. The equipment is capable of handling twenty incoming telephone lines shown entering the bridge at 60. Such lines are typical telephone loops from a central office and are two-wire in nature. Line control logic 61 responds to switching commands initiated by an operator and, when the associated circuit is closed, the signal on the incoming lines 60 is passed to line repeaters generally indicated at 62. The line repeaters include hybrid circuitry which performs a transformation between the two wire signals on the telephone line side and four wire signals on the bridging side of the repeater. As a result, each line illustrated leaving the line repeaters 62 toward the mixing bridges 64 is actually a transmit pair and a receive pair. It is noted that the receive and transmit directions are taken from the point of view of the bridge, with receive signals being incoming from the telephone lines and transmit signals being outgoing to the telephone lines.

In addition to performing the hybrid function, the line repeaters provide variable amplification controlled by the operator, and also an automatic voice switching function. More particularly, for each line incoming to a line repeater, there is a receive sensor which, when it senses signal on the associated line, operates control logic which closes a receive switch for the line on which the signal is sensed, causing that signal to be conveyed to the mixing bridge. In addition, control circuitry closes transmit switches for all other lines in the conference, providing a path for the bridged signal to be returned to the other conferees.

Each incoming group of five telephone lines 60, in addition to having line control logic and a group of line repeaters associated therewith, also has a low level mixing bridge 64. Each port in the mixing bridge is a four-wire port including a transmit pair and a receive pair. The mixing bridge is of the operational amplifier type which provides a substantial loss, on the order of 60 db from transmit to receive. Accordingly, if, for example, a signal is being received at port 2 of mixing bridge 64a, a signal will be transmitted on ports 1 and 3-5, but the 60 db loss will assure that very little signal is coupled to the transmit pair of port 2.

Each of the mixing bridges 64a–64d can establish a five port conference. To accommodate larger conferences, a pair of high level mixing bridges 65, 66 are provided, each having a four-wire port connected to a respective one of the ports of each of the bridges 64a–64d. Thus, associated switching circuitry can establish a twenty port conference on either of the high level mixing bridges 65, 66 or two smaller conferences in modules of five utilizing both mixing bridges 65, 66. It should also be noted that each of the mixing bridges 65, 66 has a further port 69, 70 respectively which is provided for connection to a similar high level mixing bridge in an adjacent conferencing system to add another 20 locations to the conference.

A final mixing bridge 67 is also connected like mixing bridges 65 and 66 such that it has access to the information on all of the lower level mixing bridges 64a–64d. A port 68 on the mixing bridge 67 provides an operator input which allows operator access to any or all channels of the conference.

Figure 3:
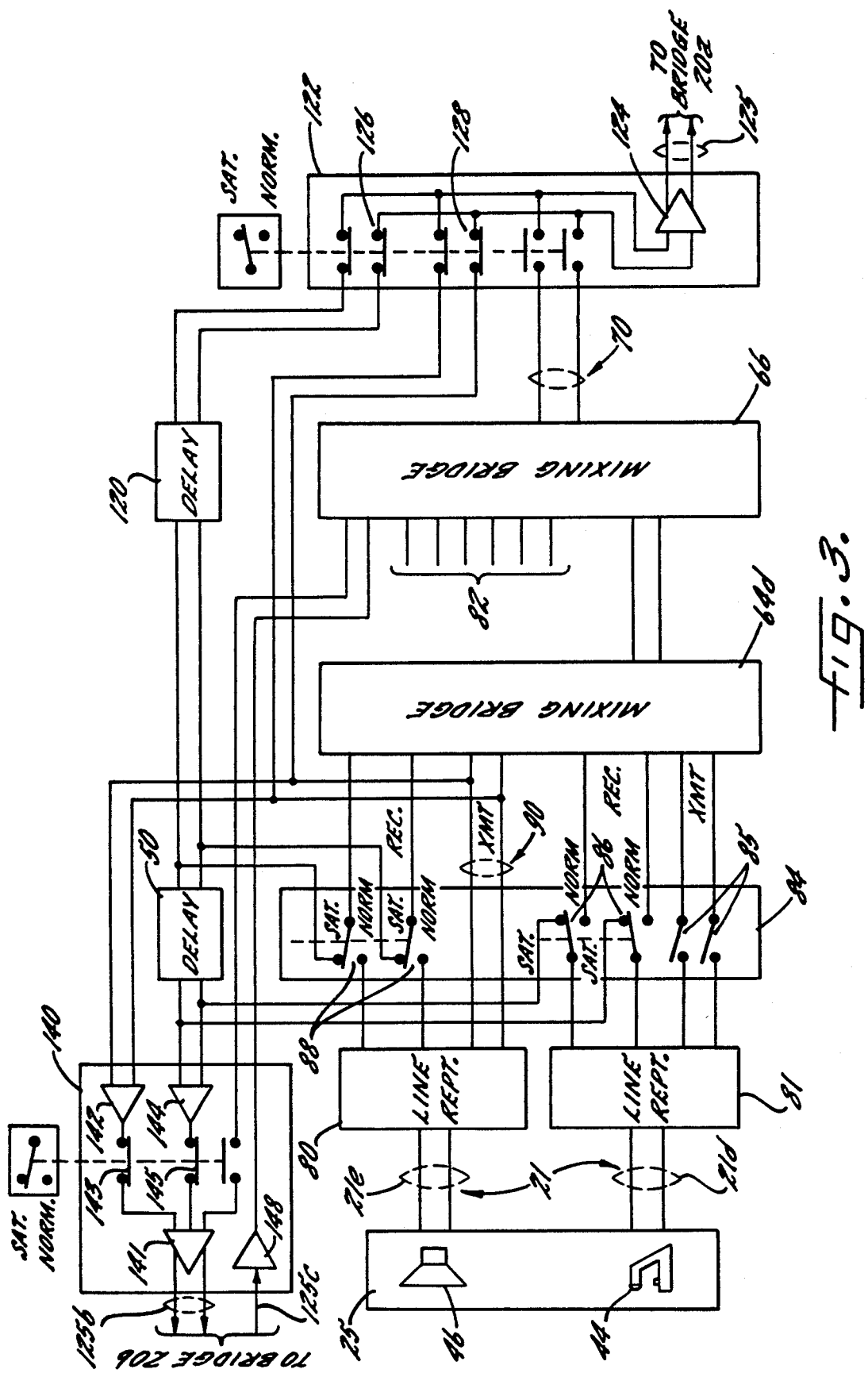
FIG. 3 is a partial schemaic diagram illustrating the portion of the conferencing bridge associated with transmission of the audio portion of the television signal.

With that basic understanding of the conferencing bridge in question, attention will now be directed to FIG. 3 for a description of how such a bridge is to be configured to properly coordinate terrestrial and satellite conveyed information in an interactive audio and video conference. FIG. 3 shows a portion of the bridge of FIG. 2 and its association with the studio 25 audio circuits of FIG. 1. More particularly, a pair of line repeaters 80, 81 within the group 62d (FIG. 2) are shown connected to the audio lines 21e, 21d respectively. The line control logic 61 of FIG. 2 is omitted for clarity. In addition, FIG. 3 shows the module 64d of the low level mixing bridge and its connections to the high level mixing bride 66. Schematically illustrated are a group of connections 82 for connection to the low level mixing bridges 64a–64c, which in turn are connected to other interactive sites in the conference. The diagram of FIG. 3 is intended primarily to show the manner in which audio information generated at the studio is combined with the mix, it being assumd that audio information from the other interactive sites is also combined in the bridge 66 as described in connection with FIG. 2.

As noted previously, the audio lines 21d, 21e connecting the studio to the bridge site each carry signals in only one direction. The line 21d carries signals to the bridge from the microphone 44, which signals are converted from two-wire to four-wire in the line repeater 81. Rather than conventionally couple the four-wire signals between the line repeater 20 and its associated port on the mixing bridge 64d, such signals are passed through a satellite delay control 84. Within the satellite delay control 84 are a pair of switches 85, 86, the first of which opens the transmit path back to the line 21d such that only unidirectional information is passed on such line. The second switch 86, in the illustrated (satellite) position, diverts the signal received from line 21d from the mixing bridge 64d, and passes such signal to the delay module 50.

In accordance with the invention, the delay module is adjusted to compensate for differences in transmission time between the satellite conveyed video signal and the terrestrially conveyed telephone signal. To that end, the delay element 50 is configured to impose a delay between input and output of about 240 milliseconds. A suitable delay module is available from Lexicon, Inc., and is known as their Model 122. The output signal from the delay module 50 is passed back to the satellite delay control 84 where a set of switches 88 passes that signal to the receive port in the mixing bridge 64*d* associated with line repeater 80. Accordingly, the moderator signal, which is received on line 21*d*, is delayed at element 50 to create a delayed moderator signal, and the delayed moderator signal added to the mix by means of the switch 88. Because the nature of the four-wire bridge 64*d* imposes a substantial loss from receive to transmit port, on the order of 60 db, the signal at the transmit port associated with line repeater 80 will carry the entire mix except for the delayed moderator signal which was imposed on its receive port. Accordingly, the signal on the port 90 can be considered a mix minus moderator signal, and such signal is returned by way of the line repeater 80 and the audio line 21*e* to the studio 25 and the associated speaker 46. As a result, an audio signal is returned to the studio 25 which conveys the full interactive mix except that the delayed moderator signal is not echoed to the moderator. That audio signal is transmitted via satellite to all non-interactive sites, so that the audio portion of the television signal received at non-interactive sites includes the moderator plus all interactive conferees, that is, all of the information in the conference.

Because the delay in the element 50 is properly adjusted, and the delayed moderator signal is conveyed to all of the interactive sites in the conference, those sites will receive their audio signal via the telephone circuit but it will arrive in synchronism with the television video signal beamed by way of the satellite. Thus, each interactive conferee has full access to all information in the interactive conference including the modified moderator signal introduced therein in such a way as to arrive at the same time as the satellite beamed television signal. The moderator also has full access to the information in the mix, but in such a way that he is not confused by his own echo. The interactive sites can use standard television sets, because what would be the interferring echo audio returned over the television link is not present since all of the audio at the interactive sites is provided via the bridge and telephone lines.

The elements of FIG. 3 thus far described can act as a stand-alone system for producing an interactive audio and video conference which includes a studio 25, eighteen interactive sites and as many non-interactive sites as have access to the satellite beamed television signal. In addition, further bridge modules can be added (with the connection being made at the ports 69, 70 of the high level mixing bridges 65, 66) to expand the conference in increments of twenty interactive sites.

As a refinement of the invention, the additional elements illustrated in FIG. 3 can be added in order to expand the geographic scope of the conference to include areas served by more than a single satellite.

Referring first to FIG. 4, there is shown an expanded conferencing arrangement including the original satellite 26 and a further satellite 100. A satellite relay site 102 includes a down-link 103 for receiving the signal from satellite 26 and an up-link 104 for relaying the received signal to the satellite 100. As a result, down-links 106, 108 which do not have access to the satellite 26, can receive the signal originating at studio 25 by virtue of the relay station and the satellite 100. However, as will now be apparent, the signals received at down-links 106, 108 are twice delayed (about 480 milliseconds) in that they have made two trips into and back from space. As a result, it is necessary to provide a double delay for any interactive site receiving the television signal from the second satellite 100.

To that end, second delay means 120 (see FIG. 3) is provided at the bridge site, for receiving the output of the first delay means 50, and creating a twice-delayed moderator signal. A second delay module or extender is available from Lexicon Inc. for use with the Model 122 delay module and is identified as Model Ex 102B. The twice delayed signal is passed to a further satellite delay control 122 which, in the normal condition (not-illustrated) simply makes the four-wire port 70 externally available for connection to another 20 line bridge. However, with the delay control 122 in the satellite position as illustrated in FIG. 3, the output of the second delay means is connected through a switch 126 to the input of an amplifier 124. The output of amplifier 124 is connected via a conductor 125 to the receive pair of the port 70 of high level mixing bridge in an adjacent conferencing bridge 20*a*. Similarly, the transmit pair of the port 70 in bridge 20*a* has a connection 125*a* to the receive pair of port 70 in bridge 20. As a result the twice-delayed moderator signal is in the mix of the bridge 20*a* (see FIG. 4) for distribution to all interactive sites connected in that bridge while the single delayed moderator signal is in the mix of the bridge 20, for distribution to the conferees connected to that bridge. For the purpose of providing the interactive sites in bridge 20*a* information from the mix in the bridge 20, the output port 90 which, it is recalled, contains the mix minus moderator signal is also connected through switch elements 128 to the input of the operational amplifier 124. Accordingly, there is provided at the high level mixing bridge in the conference bridge 20*a* the twice-delayed moderator signal summed with the mix minus moderator signal. As a result, each interactive participant connected to the bridge 20*a* receives the full mix from both bridges 20 and 20*a* along with the twice-delayed moderator signal. And by virtue of the connection 125*a* between the transmit pair of bridge 20*a* and receive pair of the bridge 20, any audio originated by a conferee connected to bridge 20*a* is added to the mix in bridge 20.

By virtue of the second delay introduced in the delay element 120, the audio conveyed to sites 110, 112 associated with the down-links 106, 108 arrives a quarter of a second later than that conveyed to the site 34, but each site receives its audio at the same time as it receives the associated portion of the video signal from its associated satellite. Furthermore, the four-wire nature of the bridge and the manner of switching the signals therebetween assures that the differently delayed signals do not interfere with each other to create objectionable echo anywhere in the system.

It is worth noting that on occasion certain telephone signals are also transmitted via satellite. For example, leased lines in some cases might be more conveniently routed via a satellite channel than through terrestrial connections or the message telephone system. In those cases, certain of the telephone signals will also experience delays equivalent to those experienced by the television signals. In such cases, it is only necessary to adjust the number of delays provided a particular satellite telephone signal to compensate for the fact that the transmission has gone via satellite. For example, if the site 110 of FIG. 4, somewhere in its connection 21*f* to the bridge 20*a* includes a satellite link, it would be necessary to reduce the number of delay intervals by one, such that, rather than receiving a twice-delayed audio signal, the station 110 would receive a single-delayed audio signal. That is easily accomplished by connecting the site 110 into the interactive conference via the bridge 20 rather than the bridge 20a. It is intended that the concept taught herein where a time delay is introduced to compensate for differences between telephone and television transmission times be sufficiently broad to encompass this situation.

As a further application of the same principal, assume a single hop site 34 has a satellite link in its telephone connection 21a. In that case the signals in the audio path via the bridge and telephone satellite, and the video signal via satellite 26 experience similar delays, requiring an undelayed moderator signal for the site 34. To accomplish that, another satellite delay control 140 is provided to create a mix with undelayed moderator signal. In the illustrated satellite position, a summing amplifier 141 receives the undelayed moderator signal via an amplifier 142 and switch contacts 143, and the mix minus moderator signal via an amplifier 144 and switch contacts 145. The output of amplifier 141 is connected via conductors 125b to a further conference bridge 20b illustrated in dashed lines in FIG. 4. Similarly, a pair of conductors 125c interconnect the transmit pair of the port 70 in bridge 20b to the receive pair of port 70 in bridge 20 via an amplifier 148. As a result, all conferees receive the full mix with an appropriately delayed moderator signal.

It will now be apparent that what has been provided is a novel means for easily and efficiently incorporating a video presentation in a fully interactive audio conference. No special television reception equipment is required. Conventionally available teleconferencing equipment of the type long in use, when used in accordance with the principles of this invention, can provide substantially enhanced teleconferencing capabilities.

I claim as my invention:

1. A method of establishing an interactive audio and video conference in which the video signal is transmitted to the interactive sites via satellite, comprising the steps of: connecting a plurality of interactive sites by means of telephone lines to a conferencing bridge to create a mix signal, connecting a first and second audio line between a television studio site and the bridge site, delaying any audio signal received from the studio site via the first audio line by an interval sufficient to compensate for differences between television and telephone transmission time, connecting the delayed audio signal to the bridge for inclusion in the mix signal for transmission via the telephone lines to the interactive sites, and creating a mix minus moderator signal and transmitting that signal via the second audio line to the studio site.

2. A method of establishing an interactive audio and video conference in which the video signal is transmitted to the interactive site via satellite, comprising the steps of connecting a plurality of interactive sites by means of telephone lines to a conferencing bridge to create a mix signal, connecting a first and second audio line between a television studio site and the bridge site, delaying any moderator audio signal received from the studio site via the first audio line by an interval sufficient to compensate for differences between television and telephone transmission time, coupling the delayed moderator signal to the bridge in such a way as to create (1) a mix with delayed moderator signal and (2) a mix minus moderator signal, sending via the connected telephone lines the mix with delayed moderator signal to all interactive sites, and sending via the second audio line the mix minus moderator signal to the studio site.

3. A method of synchronizing an audio and video interactive conference in which the video signal is transmitted to the interactive sites via satellite, comprising the steps of: connecting a conferencing bridge via a plurality of telephone lines to a plurality of interactive sites to create a mix signal, receiving via an audio line from a television studio site the moderator audio portion of the television signal, delaying the moderator signal to compensate for satellite transmission delays, supplying the delayed moderator signal to the bridge to create (1) a mix with delayed moderator signal and (2) a mix minus moderator signal, sending the mix with delayed moderator signal on the telephone lines to the interactive sites for reception thereby in time synchronization with a received television signal, and transmitting via a second audio line to the studio site the mix minus moderator signal so that the delayed moderator signal is not echoed to the studio site for retransmission.

4. A method of synchronizing an interactive audio and video conference comprising the steps of:
   at a studio site transmitting a television signal including video and audio information to a communication satellite for retransmission to earth, sending the audio portion of the television signal via an audio line to a bridge site;
   at the bridge site receiving via a plurality of telephone lines interactive audio signals from a plurality of interactive sites, receiving the audio signal from the audio line connected to the studio site and delaying the last mentioned audio signal by an amount sufficient to compensate for satellite transmission delays, mixing the delayed signal with the received interactive signals for sending to the interactive sites via the telephone lines, creating a mix minus moderator signal and coupling said signal to a further audio line connecting the bridge to the studio site for transmission in the television signal,
   at the interactive sites receiving the transmitted video signal from the satellite on a television receiver, and receiving the synchronized audio signal via the telephone lines connecting each interactive site to the bridge site, whereby the delay introduced in the audio signal at the bridge site synchronizes the audio and video signals at the interactive sites.

5. A method of synchronizing an audio and video interactive conference in which the video signal is transmitted to the interactive sites via one or more satellite retransmissions, comprising the steps of: connecting conferencing bridging means via a plurality of telephone lines to a plurality of interactive sites to create a mix signal, receiving via an audio line from a television studio site the moderator audio portion of the television signal, delaying the moderator signal to compensate for a single satellite retransmission thereby to create a single delayed moderator signal, delaying the moderator signal to compensate for a double satellite retransmission thereby to create a twice-delayed moderator signal, supplying both delayed moderator signals to the bridge means to create (1) a mix with single delayed moderator signal, (2) a mix with twice-delayed moderator signal and (3) a mix minus moderator signal, sending the mix with single delayed moderator signal via the associated telephone lines to all of the interactive sites receiving the television signal via a single satellite retransmission, sending the mix with twice-delayed moderaor signal via the associated telephone lines to all of the interactive sites receiving the television signal via two satellite retransmissions, and sending the mix minus moderator signal to the studio site via another audio line, whereby the audio signal is synchronized with the video signal at all interactive sites.

6. In a system for synchronizing an audio and video interactive conference in which the video signal is transmitted to the interactive sites via satellite, the combinaion comprising: a telephone conferencing bridge for mixing signals from a plurality of interactive sites in real time, delay means for receiving an audio poriton of a television signal from a studio site and introducing a delay sufficient to compensate for satellite transmission delays, means mixing the delayed signal with the mix signal for sending to the interactive sites for reception thereby in synchronism with the received video portion of the television signal, and means for returning the mix signal without the delayed signal to the studio site.

7. In a bridging system for coordinating audio signals from a plurality of interactive sites and a television studio site with received video signals originating at the studio site and transmitted to the interactive sites via satellite, the combination comprising: a conferencing bridge, a plurality of telephone lines connecting the interactive sites and the studio site to the bridge site, means at the bridge site for delaying the moderator audio signal received via the telephone line from the studio site by an interval sufficient to compensate for the difference between satellite transmission and telephone transmission time, means coupling the delayed moderator signal to the bridge for producing a mix with delayed moderator signal for transmission to each of the interactive sites via the associated telephone lines, means for creating a mix minus moderator signal for transmission via the associated telephone line to the studio site, whereby the telephone line transmitted moderator signal arrives at the interactive sites in synchronism with the satellite transmitted video signal.

8. An interactive audio and video conferencing system comprising in combination:
   a studio site associated with an up-link for transmitting a television signal containing moderator video and audio signals;
   a plurality of interactive sites, at least some of which are associated with down-links for receiving the moderator video signal;
   a telephone conferencing bride for connecting a plurality of telephone lines in an audio conference circuit;
   means including a telephone line operating in simplex fashion for conveying the moderator audio signal from the studio site to the bridge, means for delaying the moderator audio signal by an interval sufficient to compensate for the difference between satellite and telephone transmission times and coupling the delayed moderator signal to the bridge for creating a mix with delayed moderator signal, means including a telephone line operating in simplex fashion between the bridge and the studio site for creating and conveying a mix minus moderator signal from the bridge to the studio site, and means at the bridge for sending via telephone lines the mix with delayed moderator signal to all of the interactive sites, thereby to synchronize the audio signal so conveyed with the received television video signal.

9. The system set out in claim 8 further including a plurality of non-interactive sites associated with downlink means for receiving television video and audio signals transmitted from studio up-link, the received audio signal including the transmitted moderator audio signal originating at said studio site and the mix minus moderator signal received from the bridge site, whereby said non-interactive sites receive all of the information in the interactive conference.

10. In an interactive audio and video conference system, in which a studio site transmits a television signal to a first satellite for distribution to a first group of interactive sites, and a relay station receives and retransmits the signal from the first satellite to a second satellite for retransmission to a second group of interactive sites, a system for coordinating video and audio signals comprising the combination of telephone conferencing bridge means having telephone connections to the first and second groups of interactive sites, the bridge means also having a telephone connection to the studio site for receiving a moderator audio signal therefrom, delay means associated with the bridge means for receiving the moderator signal and producing (1) a single delayed moderator signal delayed by an interval sufficient to compensate for transmission delays from the first satellite, and (2) a twice-delayed moderator signal delayed by an interval sufficient to compensate for transmission delays from both satellites, means for creating a mix with single delayed moderator signal and sending said last mentioned signal to the first group of interactive sites via the associated telephone lines, means for creating a mix with twice-delayed moderator signal and sending said last-mentioned signal to the second group of interactive sites via the associated telephone lines, thereby to coordinate the moderator signal sent via telephone lines with the video signal transmitted via satellite.

* * * * *

UNITED STATES PATENT AND TRADEMARK OFFICE
CERTIFICATE OF CORRECTION

PATENT NO. : 4,360,827
DATED : November 23, 1982
INVENTOR(S) : DARYL BRAUN

It is certified that error appears in the above—identified patent and that said Letters Patent is hereby corrected as shown below:

Column 2, line 22, change "schemaic" to -- schematic --.

Column 11, line 45, change "bride" to -- bridge --.

Signed and Sealed this

First Day of February 1983

[SEAL]

Attest:

GERALD J. MOSSINGHOFF

Attesting Officer     Commissioner of Patents and Trademarks